(12) United States Patent
Su et al.

(10) Patent No.: US 12,039,114 B1
(45) Date of Patent: Jul. 16, 2024

(54) MOUSE DEVICE INCLUDING A MAGNETIC RATCHET

(71) Applicant: Primax Electronics Ltd., Taipei (TW)

(72) Inventors: Chun-Nan Su, Taipei (TW); Chun-Che Wu, Taipei (TW); Sheng-An Tsai, Taipei (TW); Shu-An Huang, Taipei (TW); Li-Kuei Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/212,264

(22) Filed: Jun. 21, 2023

(30) Foreign Application Priority Data

May 26, 2023 (CN) .......................... 202310611828.X

(51) Int. Cl.
*G06F 3/0354* (2013.01)
*G06F 3/0362* (2013.01)
*H01F 7/02* (2006.01)

(52) U.S. Cl.
CPC ........ *G06F 3/03543* (2013.01); *G06F 3/0362* (2013.01); *H01F 7/02* (2013.01)

(58) Field of Classification Search
None
See application file for complete search history.

(56) References Cited

U.S. PATENT DOCUMENTS

| | | | |
|---|---|---|---|
| 2007/0146324 A1* | 6/2007 | Blandin | G06F 3/0362 345/163 |
| 2009/0015360 A1* | 1/2009 | North | G05G 5/06 335/209 |
| 2017/0262083 A1* | 9/2017 | Huang | G06F 3/016 |
| 2018/0277058 A1* | 9/2018 | Zhang | G06F 3/03543 |
| 2020/0004346 A1* | 1/2020 | Vlasov | G06F 3/03543 |

* cited by examiner

*Primary Examiner* — Benjamin C Lee
*Assistant Examiner* — Emily J Frank
(74) *Attorney, Agent, or Firm* — KIRTON McCONKIE; Evan R. Witt

(57) ABSTRACT

A mouse device includes a casing and a roller module. The roller module is disposed within the casing. The roller module includes a scroll wheel, a magnetic ratchet, a supporting element and a permanent magnet. The scroll wheel includes a concave structure. The magnetic ratchet is disposed within the concave structure of the scroll wheel. While the scroll wheel is rotated, the magnetic ratchet is correspondingly rotated. The magnetic ratchet includes a ratchet frame and plural tooth structures. The plural tooth structures are discretely arranged on an inner surface of the ratchet frame. While the magnetic ratchet is rotated with the scroll wheel, the plural tooth structures of the magnetic ratchet are sequentially transferred through a region over the permanent magnet, and a magnetic attractive force between the corresponding tooth structure and the permanent magnet is generated.

9 Claims, 6 Drawing Sheets

MOUSE DEVICE INCLUDING A MAGNETIC RATCHET

FIELD OF THE INVENTION

The present invention relates to an input device, and more particularly to a mouse device with a roller module.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-key mouse device is gradually evolved into the modern wireless multi-key roller mouse device. For complying with different industrial needs or personal preferences, various electronic manufacturers have begun to create a variety of mouse device devices with different shapes in order to meet the operation requirements of different users. Consequently, people pay much attention to the comfort and sensitivity of operating the mouse button (e.g., a left button, a right button or a scroll wheel).

According to the existing design, the scroll wheel of the mouse can be rotated forwardly or backwardly, and the scroll wheel of the mouse can be pressed to trigger a switch. When the scroll wheel of the mouse is rotated forwardly or backwardly by the user, an encoder is correspondingly rotated to result in the stepped motion feel. Consequently, the function of controlling the page scrolling action of a window operation interface can be achieved. However, the scroll wheel cannot be rotated at a fast speed.

For solving the above drawbacks, a mouse with both of the function of generating the stepped motion feel upon rotation of the scroll wheel and the function of quickly rotating the scroll wheel has been introduced into the market. However, it is necessary to additionally install a motor to drive and control the rotating speed of the scroll wheel. In other words, the fabricating cost of the mouse is largely increased.

Therefore, there is a need of providing an improved mouse device in order to overcome the drawbacks of the conventional technologies.

SUMMARY OF THE INVENTION

An object of the present invention provides a mouse device with a roller module. In the roller module, a magnetic ratchet and at least one permanent magnet cooperate with each other to achieve both of the function of generating the stepped motion feel upon rotation of the scroll wheel and the function of quickly rotating the scroll wheel.

The other objects and advantages of the present invention will be understood from the disclosed technical features.

In accordance with an aspect of the present invention, a mouse device is provided. The mouse device includes a casing and a roller module. The roller module is disposed within the casing. The roller module includes a scroll wheel, a magnetic ratchet, a supporting element and at least one permanent magnet. The scroll wheel includes a concave structure. The magnetic ratchet is disposed within the concave structure of the scroll wheel. While the scroll wheel is rotated, the magnetic ratchet is correspondingly rotated. The magnetic ratchet includes a ratchet frame and plural tooth structures. The plural tooth structures are discretely arranged on an inner surface of the ratchet frame. The supporting element is located beside the scroll wheel. The supporting element includes a connecting segment and a supporting segment. The connecting segment is connected with the casing, and the supporting segment is inserted into the concave structure of the scroll wheel. The at least one permanent magnet is installed on the supporting segment of the supporting element and aligned with at least one of the plural tooth structures of the magnetic ratchet. There is a distance between each of the at least one permanent magnet and the corresponding tooth structure of the plural tooth structures. While the magnetic ratchet is rotated with the scroll wheel, the plural tooth structures of the magnetic ratchet are sequentially transferred through a region over the at least one permanent magnet, and a magnetic attractive force between the corresponding tooth structure and the at least one permanent magnet is generated.

In an embodiment, a distance between each of the at least one permanent magnet and the corresponding tooth structure of the plural tooth structures is in a range between 0.05 mm and 1.5 mm.

In an embodiment, the supporting element further includes at least one receiving structure, and the at least one receiving structure is installed on the supporting segment. Each of the at least one permanent magnet is disposed within the corresponding receiving structure and partially exposed outside the corresponding receiving structure.

In an embodiment, the at least one permanent magnet includes two permanent magnets. The supporting element includes a first receiving structure and a second receiving structure, which are opposed to each other. The two permanent magnets includes a first permanent magnet and a second permanent magnet. The first receiving structure and the second receiving structure are installed on the supporting segment. The first permanent magnet is disposed within the first receiving structure and partially exposed outside the first receiving structure. The first permanent magnet is aligned with one of the plural tooth structures of the magnetic ratchet. The second permanent magnet is disposed within the second receiving structure and partially exposed outside the second receiving structure. The second permanent magnet is aligned with another of the plural tooth structures of the magnetic ratchet.

In an embodiment, the at least one permanent magnet includes plural permanent magnets. The plural permanent magnets are divided into first-group permanent magnets and second-group permanent magnets. The supporting element includes a first receiving structure and a second receiving structure, which are opposed to each other. The first-group permanent magnets are arranged as a first Halbach array. The second-group permanent magnets are arranged as a second Halbach array. The first receiving structure and the second receiving structure are installed on the supporting segment. The first Halbach array is disposed within the first receiving structure and partially exposed outside the first receiving structure. The first Halbach array is aligned with one of the plural tooth structures of the magnetic ratchet. The second Halbach array is disposed within the second receiving structure and partially exposed outside the second Halbach array. The second Halbach array is aligned with another of the plural tooth structures of the magnetic ratchet.

In an embodiment, the casing includes an upper cover and a base member, and the upper cover and the base member are assembled with each other. An accommodation space is defined between the upper cover and the base member. The roller module is installed on the base member of the casing and disposed within the accommodation space.

In an embodiment, the casing further includes a bracket. The bracket is installed on the base member of the casing to support the scroll wheel. The connecting segment of the supporting element is connected with the bracket.

In an embodiment, the scroll wheel further includes a rotation shaft. The rotation shaft is penetrated through the concave structure of the scroll wheel. The plural tooth structures of the magnetic ratchet are arranged around the rotation shaft. The scroll wheel is pivotally coupled to the bracket through the rotation shaft. Consequently, the scroll wheel is rotatable relative to the bracket, and the magnetic ratchet is rotated with the scroll wheel.

In an embodiment, the mouse device further includes an encoder. The encoder is located beside a side of the scroll wheel away from the concave structure. The encoder is connected with the rotation shaft. While the scroll wheel is rotated, the encoder is correspondingly rotated with the scroll wheel, and the encoder generates a scrolling signal according to a result of sensing a rotating distance, a rotating direction and a rotating speed of the scroll wheel.

In an embodiment, the magnetic ratchet is made of iron metal, cobalt metal, nickel metal or a metallic material with magnetic properties.

From the above descriptions, the present invention provides the mouse device. In the roller module, one or plural permanent magnets and the cooperate with each other to achieve the purpose of the present invention. When the scroll wheel of the roller module is rotated by the user, the magnetic ratchet is correspondingly rotated with the scroll wheel. Consequently, the plural spaced tooth structures of the magnetic ratchet are sequentially transferred through the region over the permanent magnet. When any of the plural tooth structures is moved to the region over the permanent magnet, the magnetic attractive force between this tooth structure and the permanent magnet is generated. Consequently, during the rotation of the scroll wheel, a stepped motion feel like magnetic levitation (i.e., continuous attraction and release) will be generated. In this way, the function of controlling the page scrolling action of a window operation interface can be achieved. In addition, a proper distance between the permanent magnet and each of the plural tooth structures of the magnetic ratchet is maintained. That is, while the magnetic ratchet is rotated with the scroll wheel, the plural tooth structures of the magnetic ratchet and the permanent magnet are not interfered by each other. Due to this structural design, the roller module provides the operating feel of fast rotation to the user.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. The direction terms mentioned in the present invention, such as "upper", "lower", "inner", "outer", "side", etc., are only the directions for referring to the attached drawings. Therefore, the directional terms are used to describe and understand the present invention, not to limit the present invention.

Figure 1:
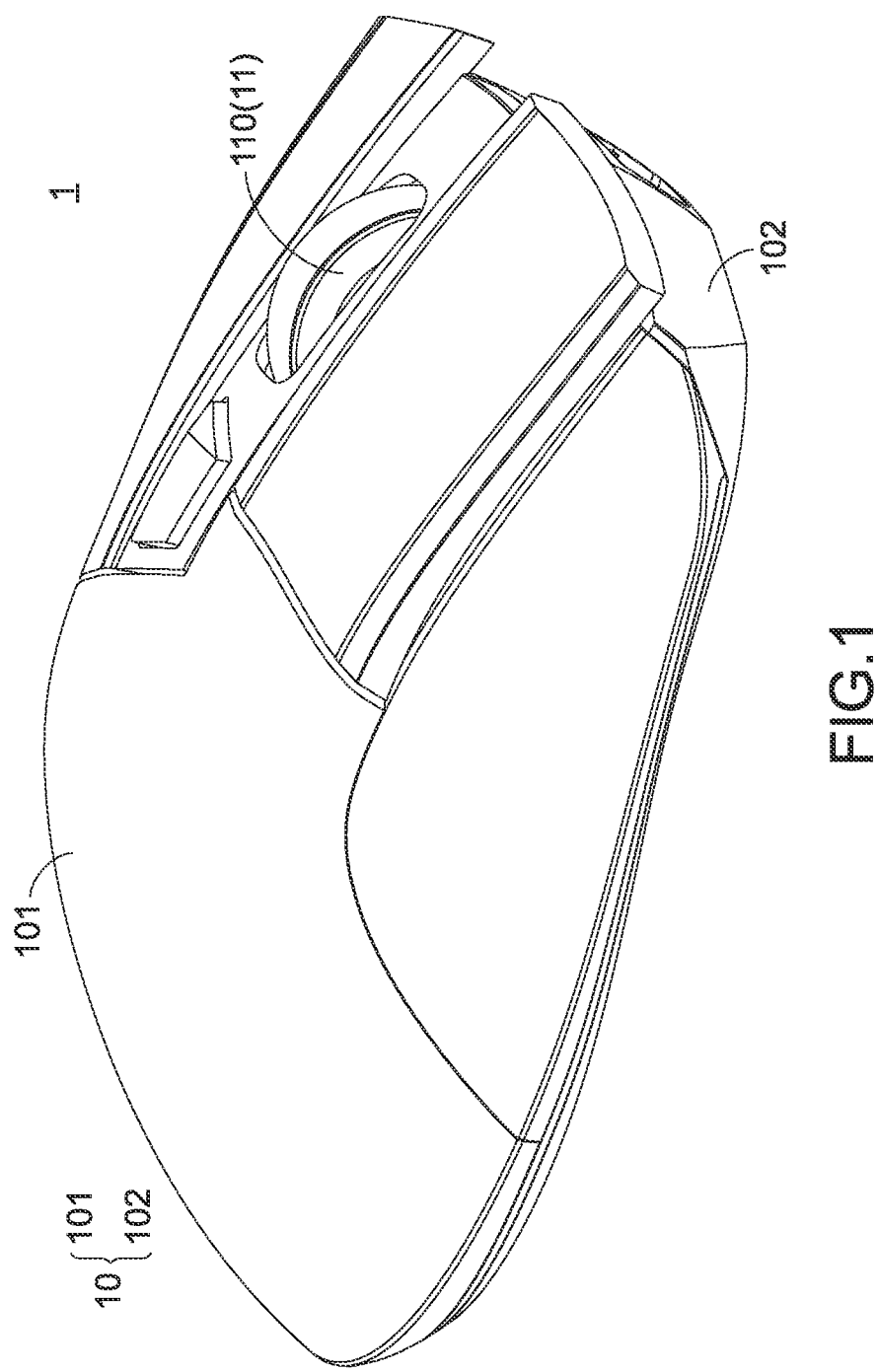
FIG. 1 is a schematic perspective view illustrating the appearance of a mouse device according to a first embodiment of the present invention.
Figure 2:
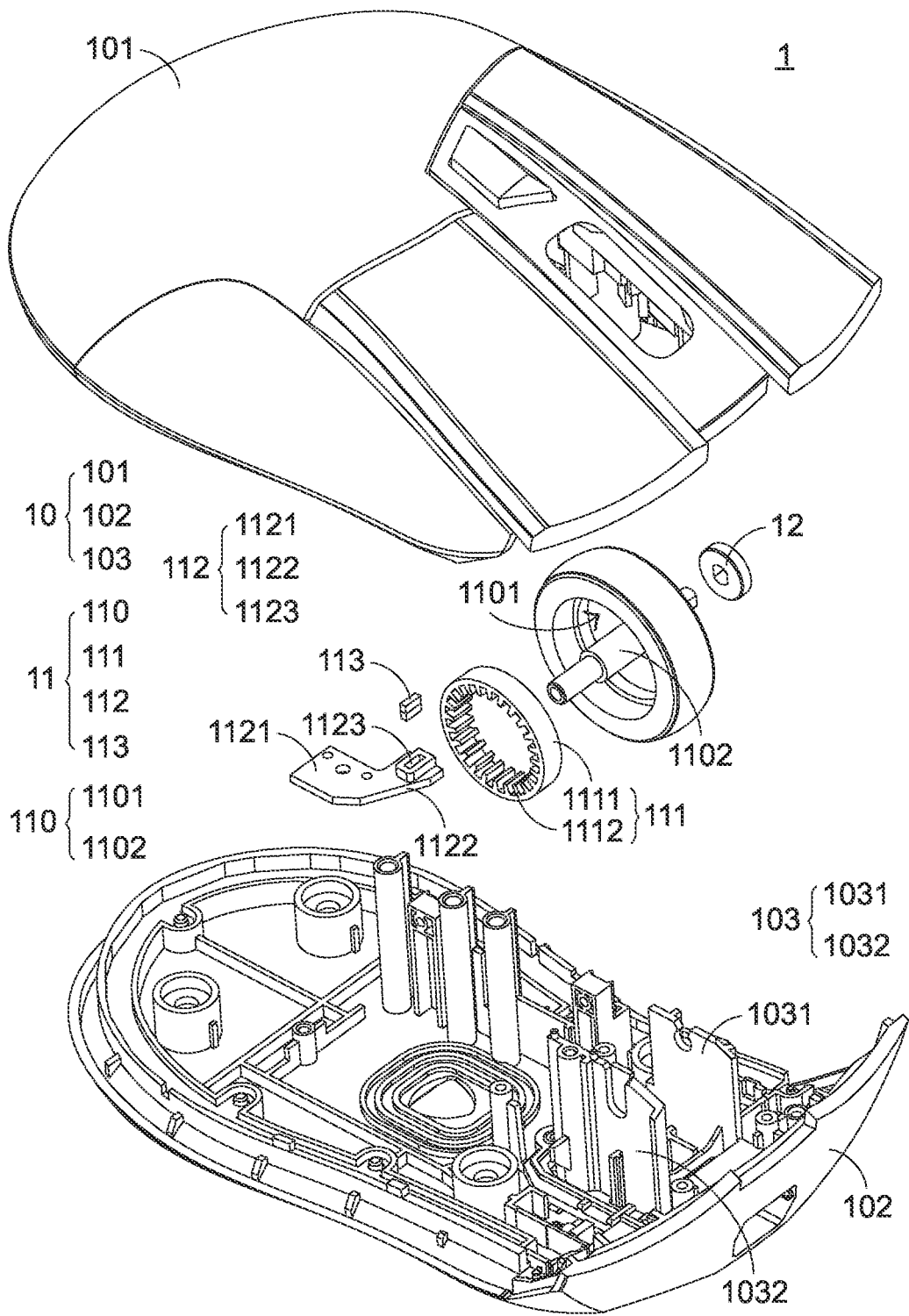
FIG. 2 is a schematic exploded view illustrating the components of the mouse device as shown in FIG. 1.
Figure 3:
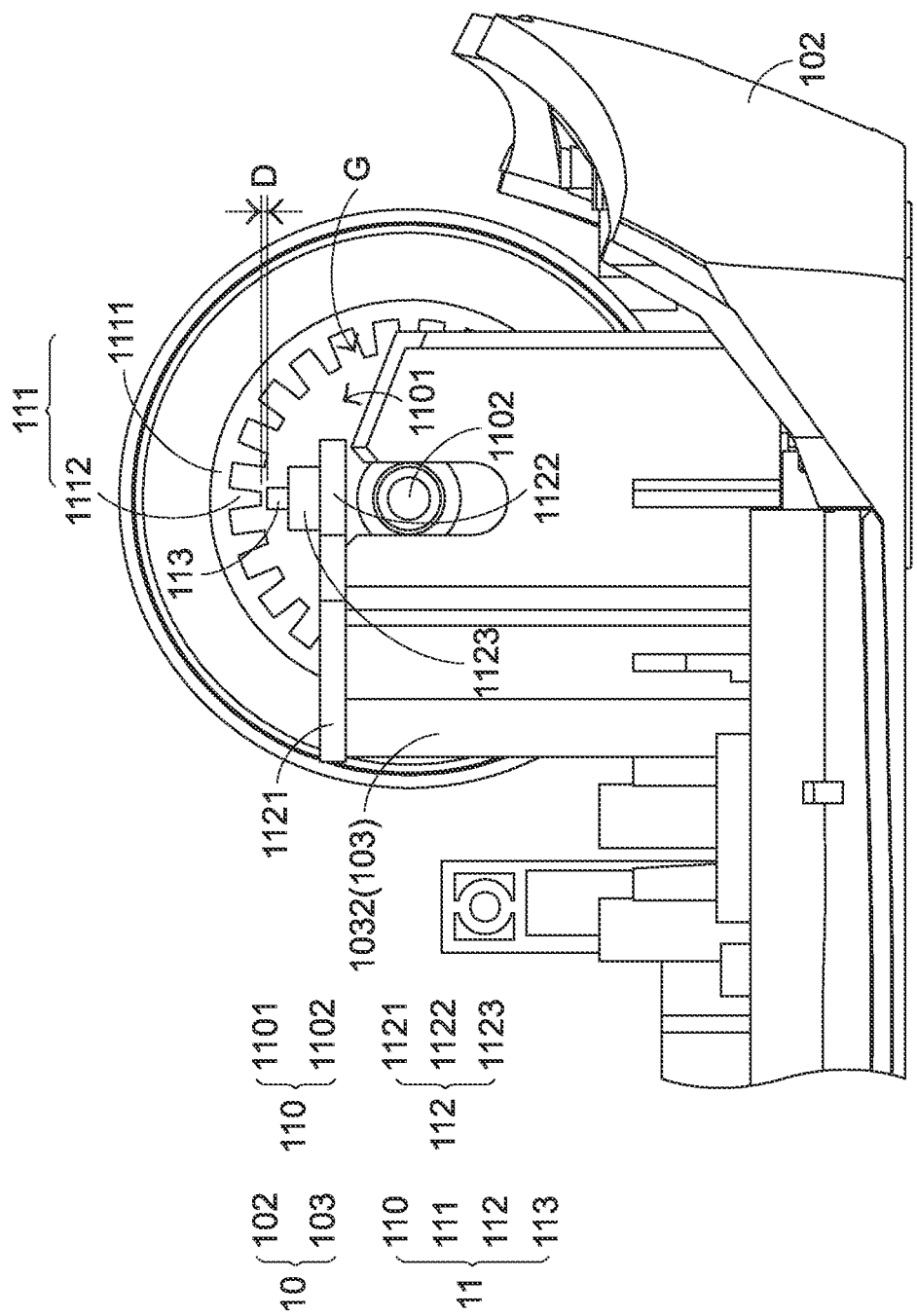
FIG. 3 is a schematic side view illustrating a portion of the assembled structure of the mouse device as shown in FIG. 2.

Please refer to FIGS. 1, 2 and 3. FIG. 1 is a schematic perspective view illustrating the appearance of a mouse device according to a first embodiment of the present invention. FIG. 2 is a schematic exploded view illustrating the components of the mouse device as shown in FIG. 1. FIG. 3 is a schematic side view illustrating a portion of the assembled structure of the mouse device as shown in FIG. 2. For succinctness, an upper cover of the mouse device shown in FIG. 2 is not shown in FIG. 3.

As shown in FIGS. 1, 2 and 3, the mouse device 1 comprises a casing 10 and a roller module 11. The roller module 11 is disposed within the casing 10. In an embodiment, the casing 10 comprises an upper cover 101 and a base member 102. The upper cover 101 and the base member 102 are assembled with each other. An accommodation space is defined between the upper cover 101 and the base member 102 of the casing 10. The roller module 11 is installed on the base member 102 of the casing 10 and disposed within the accommodation space.

Please refer to FIGS. 1, 2 and 3 again. In an embodiment, the roller module 11 comprises a scroll wheel 110, a magnetic ratchet 111, a supporting element 112 and at least one permanent magnet 113. The scroll wheel 110 comprises a concave structure 1101. As the scroll wheel 110 is rotated, the magnetic ratchet 111 is correspondingly rotated. The magnetic ratchet 111 comprises a ratchet frame 1111 and plural tooth structures 1112. The plural tooth structures 1112 of the magnetic ratchet 111 are discretely arranged on an inner surface of the ratchet frame 1111. The supporting element 112 is located beside a side of the scroll wheel 110. That is, the supporting element 112 is located beside the side of the scroll wheel 110 with the concave structure 1101. In an embodiment, the supporting element 112 comprises a connecting segment 1121 and a supporting segment 1122. The connecting segment 1121 of the supporting element 112 is connected with the casing 10. The supporting segment 1122 of the supporting element 112 is inserted into the concave structure 1101 of the scroll wheel 110. The permanent magnet 113 is installed on the supporting segment 1122 of the supporting element 112. In case that the scroll wheel 110 is not rotated (i.e., in a static condition), the permanent magnet 113 is aligned with one of the plural tooth structures 1112 of the magnetic ratchet 111. In addition, there is a distance D between the permanent magnet 113 and the corresponding tooth structure 1112.

When the scroll wheel 110 of the roller module 11 is poked by the user, the scroll wheel 110 is correspondingly rotated. As the scroll wheel 110 is rotated, the magnetic ratchet 111 is correspondingly rotated. During the rotation of the magnetic ratchet 111, the plural tooth structures 1112 of the magnetic ratchet 111 are sequentially transferred through the region over the permanent magnet 113, and a magnetic attractive force between the corresponding tooth structure 1112 and the permanent magnet 113 is generated. A first pole terminal of the permanent magnet 113 is closed to the plural tooth structures 1112 of the magnetic ratchet 111. A second pole terminal of the permanent magnet 113 is away from the plural tooth structures 1112 of the magnetic ratchet 111. In an embodiment, the first pole terminal of the permanent magnet 113 is an N-pole terminal, and the second pole terminal of the permanent magnet 113 is an S-pole terminal. It is noted that the pole types of the first and second pole terminal of the permanent magnet 113 are not restricted.

Preferably but not exclusively, the magnetic ratchet 111 is made of iron metal, cobalt metal or nickel metal. As long as the magnetic attractive force between the magnetic ratchet 111 and the permanent magnet 113 is able to be generated, the magnetic ratchet 111 is made of any appropriate metallic material with magnetic properties. In an embodiment, the supporting element 112 has a plate structure. Preferably but not exclusively, the connecting segment 1121 and the supporting segment 1122 are collaboratively formed as an L-shaped plate structure.

Preferably but not exclusively, the distance D between the permanent magnet 113 and each of the plural tooth structures 1112 of the magnetic ratchet 111 is in the range between 0.05 mm and 1.5 mm. While the plural tooth structures 1112 of the magnetic ratchet 111 are sequentially transferred through the region over the permanent magnet 113, the distance D between the permanent magnet 113 and each of the plural tooth structures 1112 of the magnetic ratchet 111 is maintained in the range between 0.05 mm and 1.5 mm. Consequently, during the rotation of the scroll wheel 110, a stepped motion feel like magnetic levitation (i.e., continuous attraction and release) will be generated.

The other structures of the mouse device 1 will be described in more details as follows.

Please refer to FIGS. 1, 2 and 3 again. In an embodiment, the casing 10 further comprises a bracket 103. The bracket 103 is installed on the base member 102 of the casing 10. For example, the bracket 103 is protruded from the base member 102 and extended in the direction toward the upper cover 101. In an embodiment, the bracket 103 comprises two supporting plates 1031 and 1032, which are aligned with each other. The bracket 103 is used for supporting the scroll wheel 110 of the roller module 11. When the scroll wheel 110 is placed on the bracket 103, the scroll wheel 110 is supported on the region between the two supporting plates 1031 and 1032. In addition, the connecting segment 1121 of the supporting element 112 is connected with the bracket 103. For example, the connecting segment 1121 of the supporting element 112 is connected with the supporting plate 1032 of the bracket 103.

Please refer to FIGS. 1, 2 and 3 again. In an embodiment, the scroll wheel 110 further comprises a rotation shaft 1102. The rotation shaft 1102 is penetrated through the concave structure 1101 of the scroll wheel 110. That is, the rotation shaft 1102 is penetrated through the central region of the concave structure 1101 of the scroll wheel 110 and protruded out of the scroll wheel 110. In addition, the plural tooth structures 1112 of the magnetic ratchet 111 are arranged around the rotation shaft 1102 of the scroll wheel 110. In this embodiment, the scroll wheel 110 is pivotally coupled to the two supporting plates 1031 and 1032 of the bracket 103 through the rotation shaft 1102. Consequently, the scroll wheel 110 is rotatable relative to the bracket 103. As the scroll wheel 110 is rotated, the magnetic ratchet 111 is correspondingly rotated.

Please refer to FIGS. 1, 2 and 3 again. In an embodiment, the supporting element 112 further comprises a receiving structure 1123. The receiving structure 1123 is installed on the supporting segment 1122. In this embodiment, the permanent magnet 113 is disposed within the receiving structure 1123 of the supporting element 112. In addition, a portion of the permanent magnet 113 is exposed outside the receiving structure 1123 and aligned with one of the plural tooth structures 1112 of the magnetic ratchet 111.

Please refer to FIGS. 1, 2 and 3 again. In an embodiment, the mouse device 1 further comprises an encoder 12. The encoder 12 is located beside the side of the scroll wheel 110 of the roller module 11 away from the concave structure 1101. The encoder 12 is connected with the rotation shaft 1102 of the scroll wheel 110. When the scroll wheel 110 of the roller module 11 is poked by the user, the scroll wheel 110 is correspondingly rotated. As the scroll wheel 110 is rotated, the encoder 12 is correspondingly rotated. By sensing the rotating distance, the rotating direction and the rotating speed of the scroll wheel 110, the encoder 12 generates a corresponding scrolling signal.

The operations of the mouse device 1 will be described in more details as follows.

As shown in FIG. 3, the plural tooth structures 1112 of the magnetic ratchet 111 are discretely arranged on an inner surface of the ratchet frame 1111. That is, there is a gap G between every two adjacent tooth structures 1112 of the plural tooth structures 1112. When the scroll wheel 110 of the roller module 11 is poked by the user, the scroll wheel 110 is correspondingly rotated. As the scroll wheel 110 is rotated, the magnetic ratchet 111 is correspondingly rotated. Consequently, the plural tooth structures 1112 of the magnetic ratchet 111 and the gaps G between the adjacent tooth structures 1112 are sequentially transferred through the region over the permanent magnet 113. When any of the plural tooth structures 1112 is moved to the region over the permanent magnet 113, the magnetic attractive force between this tooth structure 1112 and the permanent magnet 113 is generated. When the gap G between any two adjacent tooth structures 1112 is moved to the region over the permanent magnet 113, the magnetic attractive force is attenuated or eliminated. As mentioned above, the plural tooth structures 1112 of the magnetic ratchet 111 and the gaps G between the adjacent tooth structures 1112 are alternately transferred through the region over the permanent magnet 113. Consequently, during the rotation of the scroll wheel 110, a stepped motion feel like magnetic levitation (i.e., continuous attraction and release) will be generated. In this way, the function of controlling the page scrolling action of a window operation interface can be achieved.

As mentioned above, a proper distance D between the permanent magnet 113 and each of the plural tooth structures 1112 of the magnetic ratchet 111 is maintained. That is, while the magnetic ratchet 111 is rotated with the scroll wheel 110, the plural tooth structures 1112 of the magnetic ratchet 111 and the permanent magnet 113 are not interfered by each other. Consequently, when the scroll wheel 110 is rotated by the user at a fast speed, the roller module 11 provides the operating feel of fast rotation to the user.

Figure 4:
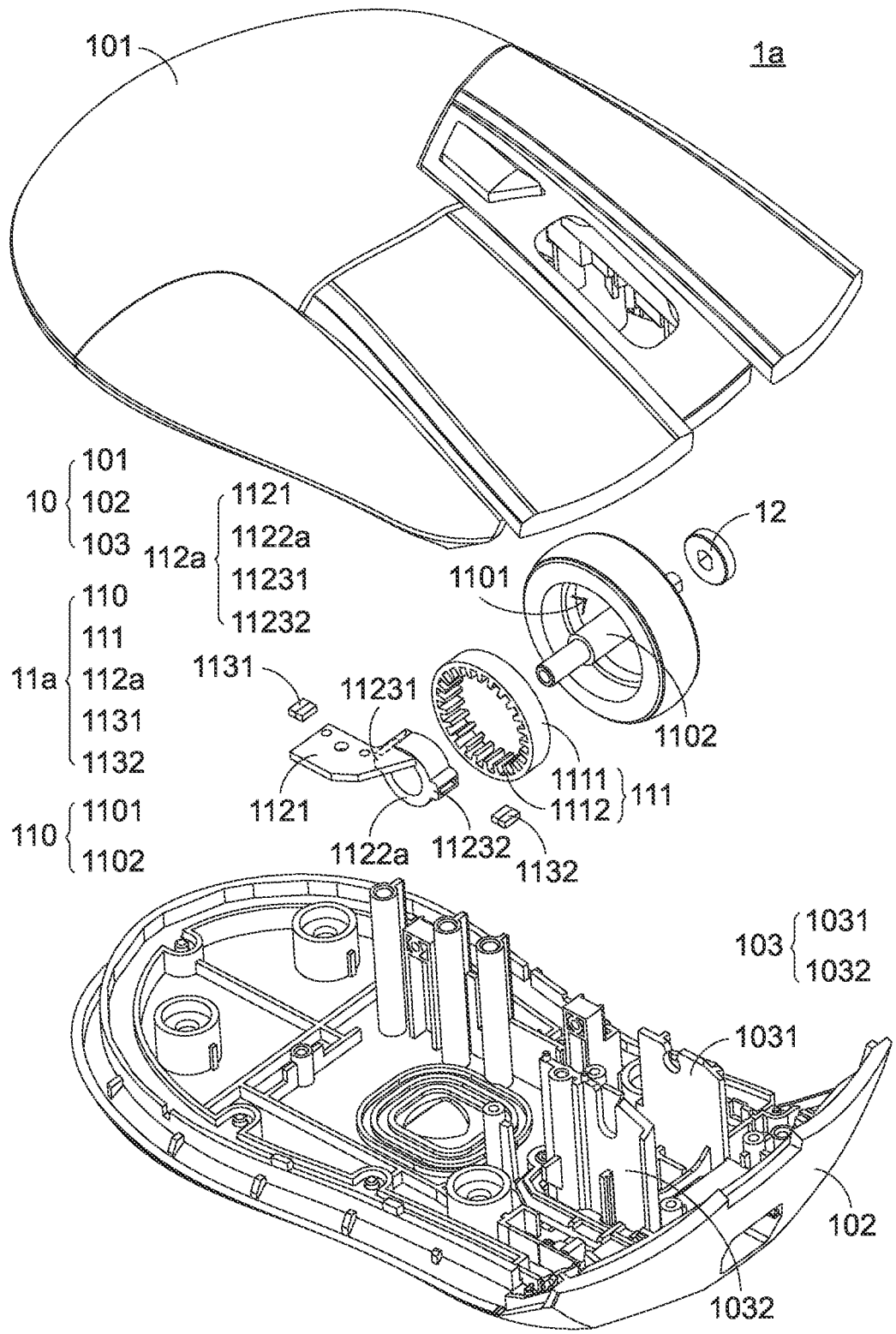
FIG. 4 is a schematic exploded view illustrating a mouse device according to a second embodiment of the present invention.
Figure 5:
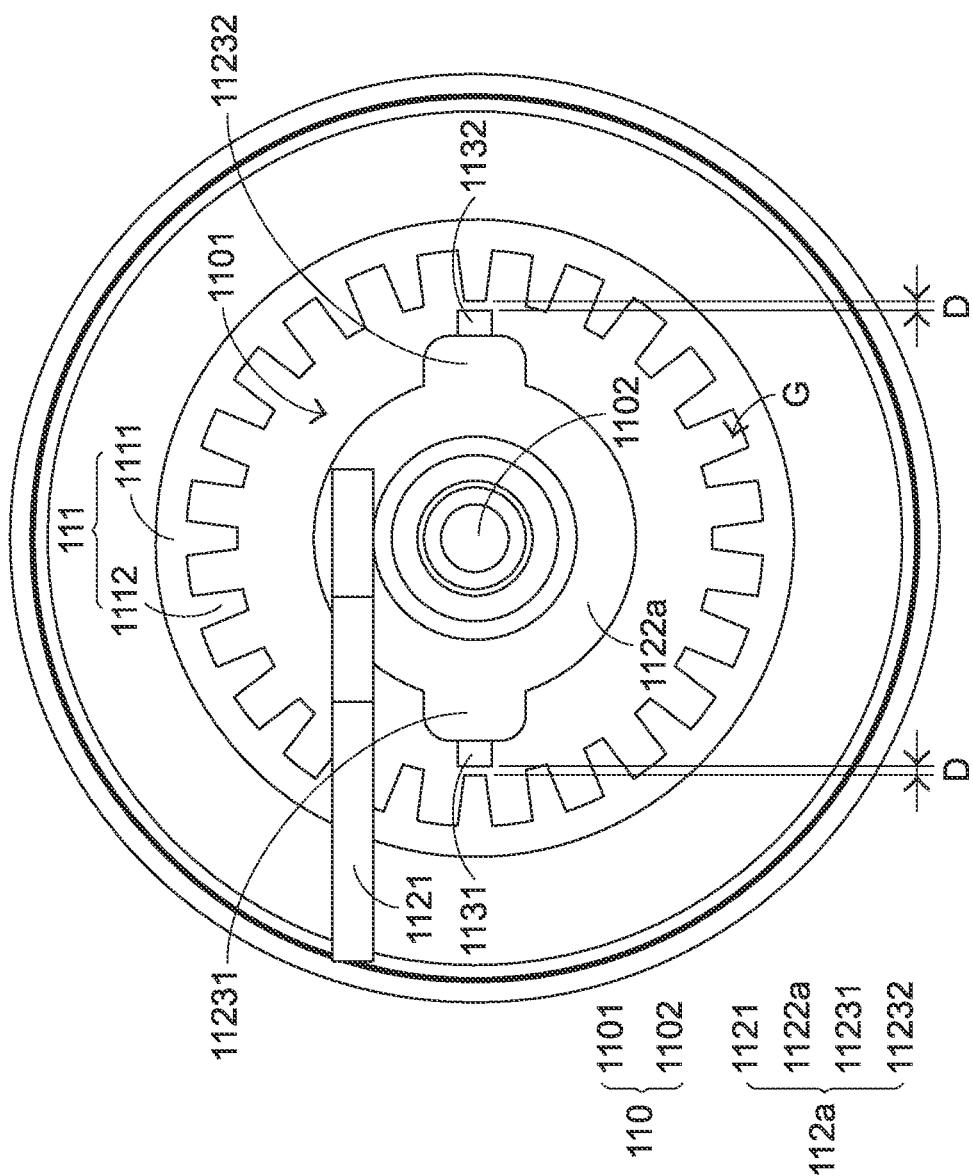
FIG. 5 is a schematic side view illustrating a portion of the assembled structure of the mouse device as shown in FIG. 4.

Please refer to FIGS. 4 and 5. FIG. 4 is a schematic exploded view illustrating a mouse device according to a second embodiment of the present invention. FIG. 5 is a schematic side view illustrating a portion of the assembled structure of the mouse device as shown in FIG. 4. As shown in FIGS. 4 and 5, the components of the mouse device 1a of this embodiment are similar to those of the mouse device 1 as shown in FIG. 1. In comparison with the embodiment of FIG. 1, the roller module 11a in the mouse device 1a of this embodiment comprises two permanent magnets, i.e., a first permanent magnet 1131 and a second permanent magnet 1132. Furthermore, the supporting segment 1122a of the supporting element 112a comprises two receiving structures corresponding to the two permanent magnets. The two receiving structures of the supporting segment 1122a includes a first receiving structure 11231 and a second receiving structure 11232. The first receiving structure 11231 and the second receiving structure 11232 are opposed to each other.

In this embodiment, the first permanent magnet 1131 is disposed within the first receiving structure 11231, and a portion of the first permanent magnet 1131 is exposed outside the first receiving structure 11231. Similarly, the second permanent magnet 1132 is disposed within the second receiving structure 11232, and a portion of the second permanent magnet 1132 is exposed outside the second receiving structure 11232.

In case that the scroll wheel 110 is not rotated (i.e., in a static condition), the first permanent magnet 1131 is aligned with one of the plural tooth structures 1112 of the magnetic ratchet 111, and the second permanent magnet 1132 is aligned with another of the plural tooth structures 1112 of the magnetic ratchet 111.

In this embodiment, the connecting segment 1121 of the supporting element 112a has a plate structure, and the supporting segment 1122a of the supporting element 112a has a ring-shaped structure. It is noted that the example of the supporting element is not restricted.

In this embodiment, the roller module 11a of the mouse device 1a comprises two permanent magnets. Due to this structural design, the operation of the roller module 11a can provide the stepped motion feel like magnetic levitation (i.e., continuous attraction and release) to the user. Furthermore, the rotation process of the scroll wheel 110 is more stable and smoother, and the stepped motion feel is clearer and clearer.

In the above embodiment, the mouse device comprises two permanent magnets. It is noted that the number of the permanent magnets is not restricted. For example, in some other embodiments, the mouse device comprises more than two permanent magnets according to the practical requirements.

Figure 6:
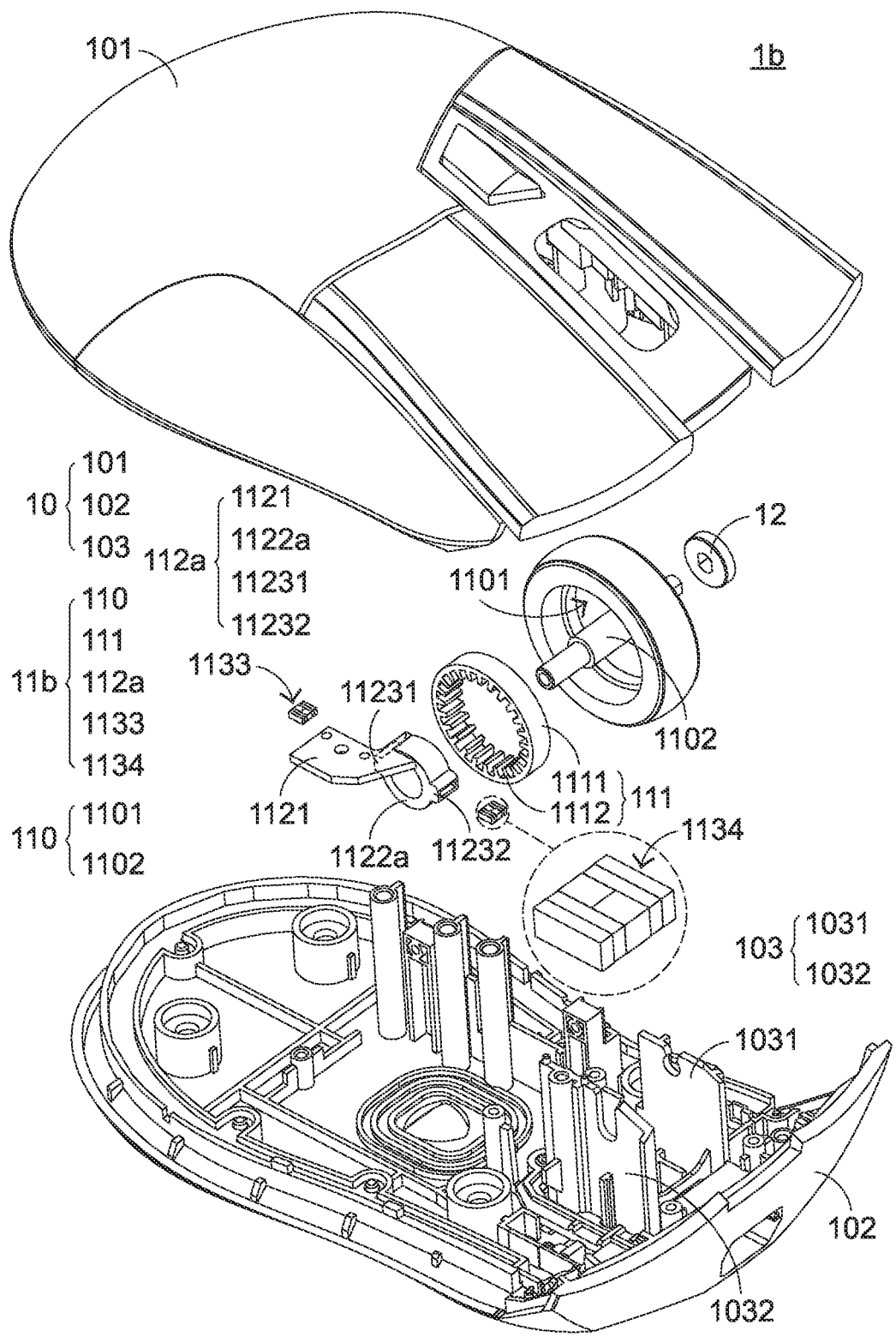
FIG. 6 is a schematic exploded view illustrating a mouse device according to a third embodiment of the present invention.

FIG. 6 is a schematic exploded view illustrating a mouse device according to a third embodiment of the present invention. As shown in FIG. 6, the components of the mouse device 1B of this embodiment are similar to those of the mouse device 1a as shown in FIG. 4. In comparison with the embodiment of FIG. 4, the roller module 11b in the mouse device 1B of this embodiment comprises more than two permanent magnets.

These permanent magnets are divided into first-group permanent magnets and second-group permanent magnets. The first-group permanent magnets are arranged as a first Halbach array 1133. The second-group permanent magnets are arranged as a second Halbach array 1134. In this embodiment, the first Halbach array 1133 is disposed within the first receiving structure 11231 of the supporting segment 1122a of the supporting element 112a, and a portion of the first Halbach array 1133 is exposed outside the first receiving structure 11231. Similarly, the second Halbach array 1134 is disposed within the second receiving structure 11232 of the supporting segment 1122a of the supporting element 112a, and a portion of the second Halbach array 1134 is exposed outside the second receiving structure 11232.

In case that the scroll wheel 110 is not rotated (i.e., in a static condition), the first Halbach array 1133 is aligned with one of the plural tooth structures 1112 of the magnetic ratchet 111, and the second Halbach array 1134 is aligned with another of the plural tooth structures 1112 of the magnetic ratchet 111.

In an embodiment, the magnetic poles of the first Halbach array 1133 close to the plural tooth structures 1112 of the magnetic ratchet 111 are sequentially N, S, N, S and N poles, and the magnetic poles of the first Halbach array 1133 away from the plural tooth structures 1112 of the magnetic ratchet 111 are sequentially N, S and N poles. The pole arrangements of the second Halbach array 1134 are similar to the pole arrangements of the first Halbach array 1133, and not redundantly described herein.

In this embodiment, the roller module 11b of the mouse device 1b comprises more than two permanent magnets. Moreover, these permanent magnets are assembled as the first Halbach array 1133 and the second Halbach array 1134. Due to this structural design, the operation of the roller module 11b can provide the stepped motion feel like magnetic levitation (i.e., continuous attraction and release) to the user. Furthermore, the rotation process of the scroll wheel 110 is more stable and smoother, and the stepped motion feel is clearer and clearer.

In the above embodiment, the plural permanent magnets are assembled as two Halbach arrays. It is noted that the number of the Halbach arrays is not restricted. For example, in some other embodiments, the mouse device comprises more than two Halbach arrays according to the practical requirements.

From the above descriptions, the present invention provides the mouse device. In the roller module, one or plural permanent magnets and the cooperate with each other to achieve the purpose of the present invention. When the scroll wheel of the roller module is rotated by the user, the magnetic ratchet is correspondingly rotated with the scroll wheel. Consequently, the plural spaced tooth structures of the magnetic ratchet are sequentially transferred through the region over the permanent magnet. When any of the plural tooth structures is moved to the region over the permanent magnet, the magnetic attractive force between this tooth structure and the permanent magnet is generated. Consequently, during the rotation of the scroll wheel, a stepped motion feel like magnetic levitation (i.e., continuous attraction and release) will be generated. In this way, the function of controlling the page scrolling action of a window operation interface can be achieved. In addition, a proper distance between the permanent magnet and each of the plural tooth structures of the magnetic ratchet is maintained. That is, while the magnetic ratchet is rotated with the scroll wheel, the plural tooth structures of the magnetic ratchet and the permanent magnet are not interfered by each other. Due to this structural design, the roller module provides the operating feel of fast rotation to the user.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising: a casing; and a roller module disposed within the casing, and comprising:
   a scroll wheel comprising a concave structure;
   a magnetic ratchet disposed within the concave structure of the scroll wheel, wherein while the scroll wheel is rotated, the magnetic ratchet is correspondingly rotated, wherein the magnetic ratchet comprises a ratchet frame and plural tooth structures, and the plural tooth structures are discretely arranged on an inner surface of the ratchet frame;
   a supporting element located beside the scroll wheel, and comprising a connecting segment and a supporting segment, wherein the connecting segment is connected with the casing, and the supporting segment is inserted into the concave structure of the scroll wheel; and
   at least one permanent magnet inside the scroll wheel and installed on the supporting segment of the supporting element, and each aligned with one of the plural tooth structures of the magnetic ratchet, wherein there is a distance between each of the at least one permanent magnet and the corresponding tooth structure of the plural tooth structures,
   wherein while the magnetic ratchet is rotated with the scroll wheel, the plural tooth structures of the magnetic ratchet are sequentially transferred through a region over the at least one permanent magnet, and a magnetic attractive force between the corresponding tooth structure and the at least one permanent magnet is generated,
   wherein the distance between each of the at least one permanent magnet and the corresponding tooth structure of the plural tooth structures is in a range between 0.05 mm and 1.5 mm.

2. The mouse device according to claim 1, wherein the supporting element further comprises at least one receiving structure, and the at least one receiving structure is installed on the supporting segment, wherein each of the at least one permanent magnet is disposed within the corresponding receiving structure and partially exposed outside the corresponding receiving structure.

3. The mouse device according to claim 1, wherein the at least one permanent magnet includes two permanent magnets, and the supporting element comprises a first receiving structure and a second receiving structure, which are opposed to each other, wherein the two permanent magnets includes a first permanent magnet and a second permanent magnet, and the first receiving structure and the second receiving structure are installed on the supporting segment, wherein the first permanent magnet is disposed within the first receiving structure and partially exposed outside the first receiving structure, the first permanent magnet is aligned with one of the plural tooth structures of the magnetic ratchet, the second permanent magnet is disposed within the second receiving structure and partially exposed outside the second receiving structure, and the second permanent magnet is aligned with another of the plural tooth structures of the magnetic ratchet.

4. The mouse device according to claim 1, wherein the at least one permanent magnet includes plural permanent magnets, the plural permanent magnets are divided into first-group permanent magnets and second-group permanent magnets, and the supporting element comprises a first receiving structure and a second receiving structure, which are opposed to each other, wherein the first-group permanent magnets are arranged as a first Halbach array, and the second-group permanent magnets are arranged as a second Halbach array, and the first receiving structure and the second receiving structure are installed on the supporting segment, wherein the first Halbach array is disposed within the first receiving structure and partially exposed outside the first receiving structure, the first Halbach array is aligned with one of the plural tooth structures of the magnetic ratchet, the second Halbach array is disposed within the second receiving structure and partially exposed outside the second Halbach array, and the second Halbach array is aligned with another of the plural tooth structures of the magnetic ratchet.

5. The mouse device according to claim 1, wherein the casing comprises an upper cover and a base member, and the upper cover and the base member are assembled with each other, wherein an accommodation space is defined between the upper cover and the base member, and the roller module is installed on the base member of the casing and disposed within the accommodation space.

6. The mouse device according to claim 5, wherein the casing further comprises a bracket, wherein the bracket is installed on the base member of the casing to support the scroll wheel, and the connecting segment of the supporting element is connected with the bracket.

7. The mouse device according to claim 6, wherein the scroll wheel further comprises a rotation shaft, wherein the rotation shaft is penetrated through the concave structure of the scroll wheel, and the plural tooth structures of the magnetic ratchet are arranged around the rotation shaft, wherein the scroll wheel is pivotally coupled to the bracket through the rotation shaft, so that the scroll wheel is rotatable relative to the bracket and the magnetic ratchet is rotated with the scroll wheel.

8. The mouse device according to claim 7, wherein the mouse device further comprises an encoder, wherein the encoder is located beside a side of the scroll wheel away from the concave structure, and the encoder is connected with the rotation shaft, wherein while the scroll wheel is rotated, the encoder is correspondingly rotated with the scroll wheel, and the encoder generates a scrolling signal according to a result of sensing a rotating distance, a rotating direction and a rotating speed of the scroll wheel.

9. The mouse device according to claim 1, wherein the magnetic ratchet is made of iron metal, cobalt metal, nickel metal or a metallic material with magnetic properties.

* * * * *